United States Patent
Hattori et al.

(10) Patent No.: US 11,059,390 B2
(45) Date of Patent: Jul. 13, 2021

(54) SLIDING DEVICE

(71) Applicant: TOYOTA BOSHOKU KABUSHIKI KAISHA, Aichi (JP)

(72) Inventors: Takashi Hattori, Aichi (JP); Motohisa Nakamura, Gifu (JP); Takuya Mizuno, Aichi (JP); Tsutomu Oya, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/745,780

(22) Filed: Jan. 17, 2020

(65) Prior Publication Data

US 2020/0238858 A1    Jul. 30, 2020

(30) Foreign Application Priority Data

Jan. 25, 2019    (JP) ............................. JP2019-011285

(51) Int. Cl.
*B60N 2/00* (2006.01)
*B60N 2/07* (2006.01)

(52) U.S. Cl.
CPC ................. *B60N 2/0722* (2013.01)

(58) Field of Classification Search
CPC ........ B60N 2/0715; B60N 2/06; B60N 2/067; B60N 2/07; B60N 2/0702
USPC ......................................... 248/424, 429, 430
See application file for complete search history.

(56) References Cited

U.S. PATENT DOCUMENTS

| | | | |
|---|---|---|---|
| 5,746,409 A | 5/1998 | Rees | |
| 10,059,230 B2* | 8/2018 | Kume | A47C 1/12 |
| 2013/0020459 A1* | 1/2013 | Moriyama | B60N 2/01 |
| | | | 248/636 |
| 2014/0110554 A1* | 4/2014 | Oya | B60N 2/0722 |
| | | | 248/430 |
| 2018/0001791 A1* | 1/2018 | Kume | B60N 2/0705 |
| 2018/0086230 A1* | 3/2018 | Kume | B60N 2/0705 |
| 2018/0086232 A1* | 3/2018 | Kume | B60N 2/0707 |
| 2020/0001745 A1* | 1/2020 | Shimizu | B60N 2/0818 |

FOREIGN PATENT DOCUMENTS

JP    3110003    11/2000

* cited by examiner

*Primary Examiner* — Steven M Marsh
(74) *Attorney, Agent, or Firm* — Greenblum & Bernstein, P.L.C.

(57) ABSTRACT

Disclosed is one example of a sliding device in which a movable rail can be inhibited from being largely deformed even when a load such as a compressed load acts on the movable rail. The sliding device includes a fixed rail, a movable rail, and a load receiving portion. The fixed rail is configured to be fixed to a vehicle. To the movable rail, the seat body is attachable. The movable rail is slidable with respect to the fixed rail. The load receiving portion extends from a fixed rail side toward a movable rail side. The load receiving portion is configured to receive a load directed from the movable rail toward the fixed rail in conjunction with the movable rail when the load acts on the movable rail.

8 Claims, 3 Drawing Sheets

SLIDING DEVICE

CROSS-REFERENCE TO RELATED APPLICATIONS

The present application claims the benefit of Japanese Patent Application No. 2019-0011285 filed on Jan. 25, 2019 with the Japan Patent Office, the entire of which is incorporated herein by reference.

BACKGROUND

The present disclosure relates to a sliding device that supports a seat body of a vehicle seat in a slidable manner.

As disclosed in, for example, the official gazette of Japanese Patent No. 3110003, a sliding device includes a fixed rail, such as a lower rail, and a movable rail, such as an upper rail. A compressed load that acts on the upper rail is transmitted to the lower rail through the upper rail.

SUMMARY

In the invention disclosed in the aforementioned gazette, when a load such as the compressed load, directed from the movable rail to the fixed rail acts on the movable rail, the movable rail may be deformed.

It is desirable that the present disclosure provides a sliding device in which the movable rail can be inhibited from being deformed to a large extent even when a load such as the compressed load acts on the movable rail.

One aspect of the present disclosure relates to a sliding device configured to support a seat body of a vehicle seat in a slidable manner. The sliding device comprises a fixed rail, a movable rail, and a load receiving portion. The fixed rail is configured to be fixed to a vehicle. To the movable rail, the seat body is attachable. The movable rail is slidable with respect to the fixed rail. The load receiving portion extends from a fixed rail side toward a movable rail side. The load receiving portion is configured to receive a load directed from the movable rail toward the fixed rail in conjunction with the movable rail when the load acts on the movable rail.

In the sliding device, the movable rail is thus inhibited from being deformed to a large extent, even when a load such as a compressed load acts on the movable rail.

According to one aspect of the present disclosure, the load receiving portion may be configured to slide with respect to the fixed rail in an integrated manner with the movable rail. Thus, a load such as the compressed load can be received by the load receiving portion in the sliding device, irrespective of the position of the movable rail. Accordingly, large deformation of the movable rail can be more reliably inhibited in the sliding device.

According to one aspect of the present disclosure, the movable rail may comprise a clamp configured to fasten and secure the seat body. A distal end of the load receiving portion in an extending direction may be located directly below the clamp. Thus, a load such as the compressed load applied from the clamp can be more reliably transmitted to the load receiving portion in the sliding device. Accordingly, the large deformation of the movable rail can be inhibited in the sliding device.

According to one aspect of the present disclosure, the sliding device may further comprise at least one roller that makes the movable rail slidable with respect to the fixed rail. The movable rail may comprise at least one roller bracket supporting the at least one roller. The load receiving portion may be integrated with the at least one roller bracket. Such a structure can facilitate production of the sliding device in which the large deformation of the movable rail can be inhibited.

According to the present disclosure, the load receiving portion may be fixed to the at least one roller bracket by swaging. Thus, dimensional accuracy of the at least one roller bracket can be maintained.

Specifically, if the load receiving portion is fixed to the roller bracket by welding, the roller bracket may be thermally deformed due to the heat of the welding. In the sliding device, however, the load receiving portion is fixed to the roller bracket by swaging, which is less likely to cause thermal deformation, and thus the dimensional accuracy of the roller bracket can be maintained.

According to one aspect of the present disclosure, the load receiving portion may be located at a front end of the movable rail in a sliding direction. Thus, the portion of the movable rail where a load such as the compressed load is highly likely to be applied can be more reliably reinforced.

BRIEF DESCRIPTION OF THE DRAWINGS

Some embodiments of the present disclosure will be described hereinafter by way of example with reference to the accompanying drawings, in which.

DETAILED DESCRIPTION OF EXEMPLARY EMBODIMENTS

Figure 1:
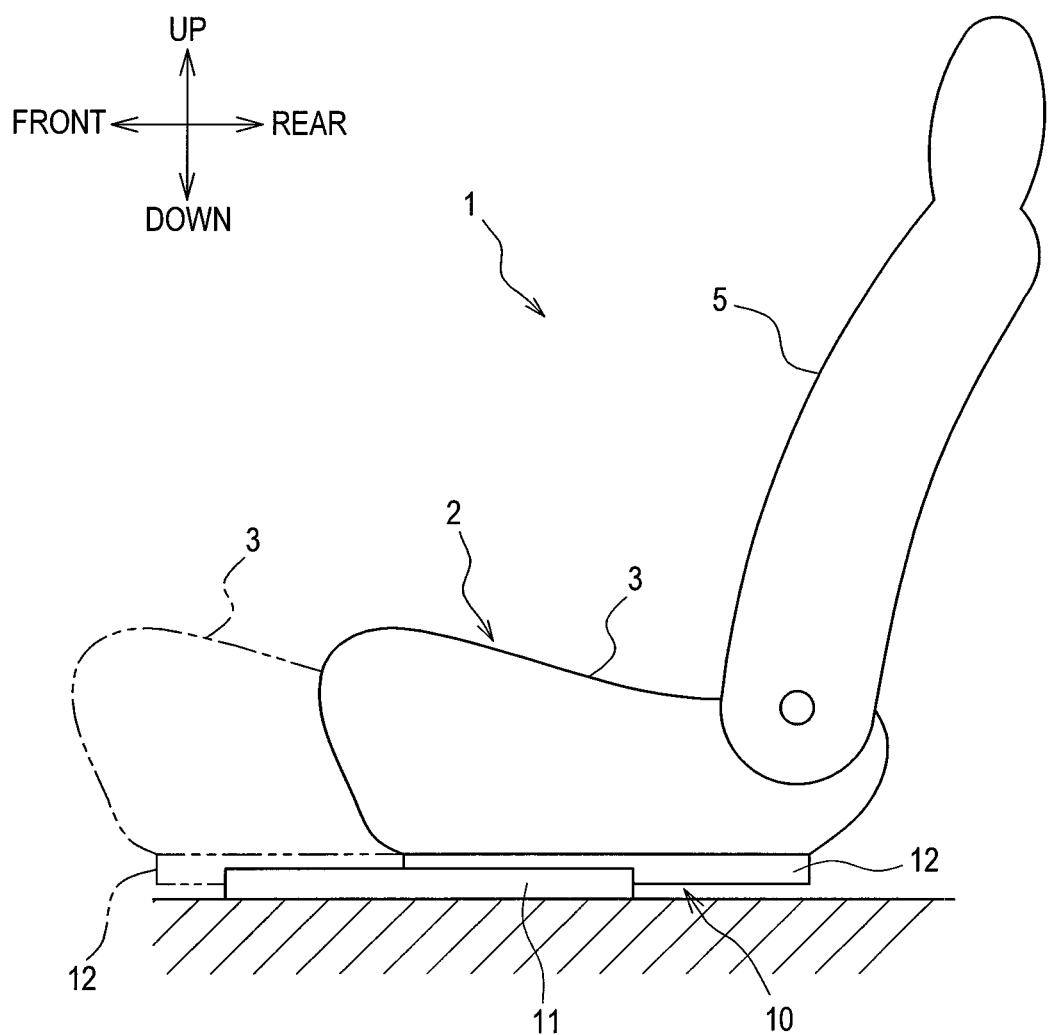
FIG. 1 is a diagram showing a vehicle seat according to a first embodiment.

Embodiments below describe examples of embodiments within the technical scope of the present disclosure. In other words, matters specifying the invention recited in the appended claims are not limited to specific configurations and structures to be described below.

The embodiments below relate to a seat to be installed in a vehicle such as an automobile (hereinafter referred to as a vehicle seat). Arrows indicating the directions, hatched lines, and so on in the drawings are made for easy understanding of the relations between the drawings, the shapes of constituent members or portions, and so on.

Accordingly, the sliding device is not limited by the directions shown in the drawings. The directions shown in the figures are based on a state in which the vehicle seat according to the embodiments below is installed in the automobile.

In regard at least to a member or a portion provided with a reference numeral and explained below, there is at least one such member or portion unless it is specified, for example, that there is only one such member or portion. In other words, two or more of such members or portions may be provided if the number is not specified to be only one. The sliding device according to the present disclosure comprises at least components, such as the members or portions, provided with reference numerals and to be explained below.

First Embodiment

1. Overview of Vehicle Seat (see FIG. 1)

A vehicle seat 1 according to the present embodiment at least comprises two sliding devices 10 and a seat body 2. The seat body 2 at least includes a seat cushion 3 and a seatback 5.

The seat cushion 3 supports the buttocks of an occupant. The seatback 5 supports the back of the occupant. The two sliding devices 10 support the seat body 2 of the vehicle seat 1 in a slidable manner.

The seat body 2 is slidably supported by the two sliding devices 10.

Specifically, among the two sliding devices 10, a first sliding device 10 supports a first end of the seat body 2 in a seat width direction, and a second sliding device 10 supports a second end of the seat body 2 in the seat width direction.

2. Structure of Sliding Devices

<Overview of Sliding Devices>

Figure 2:
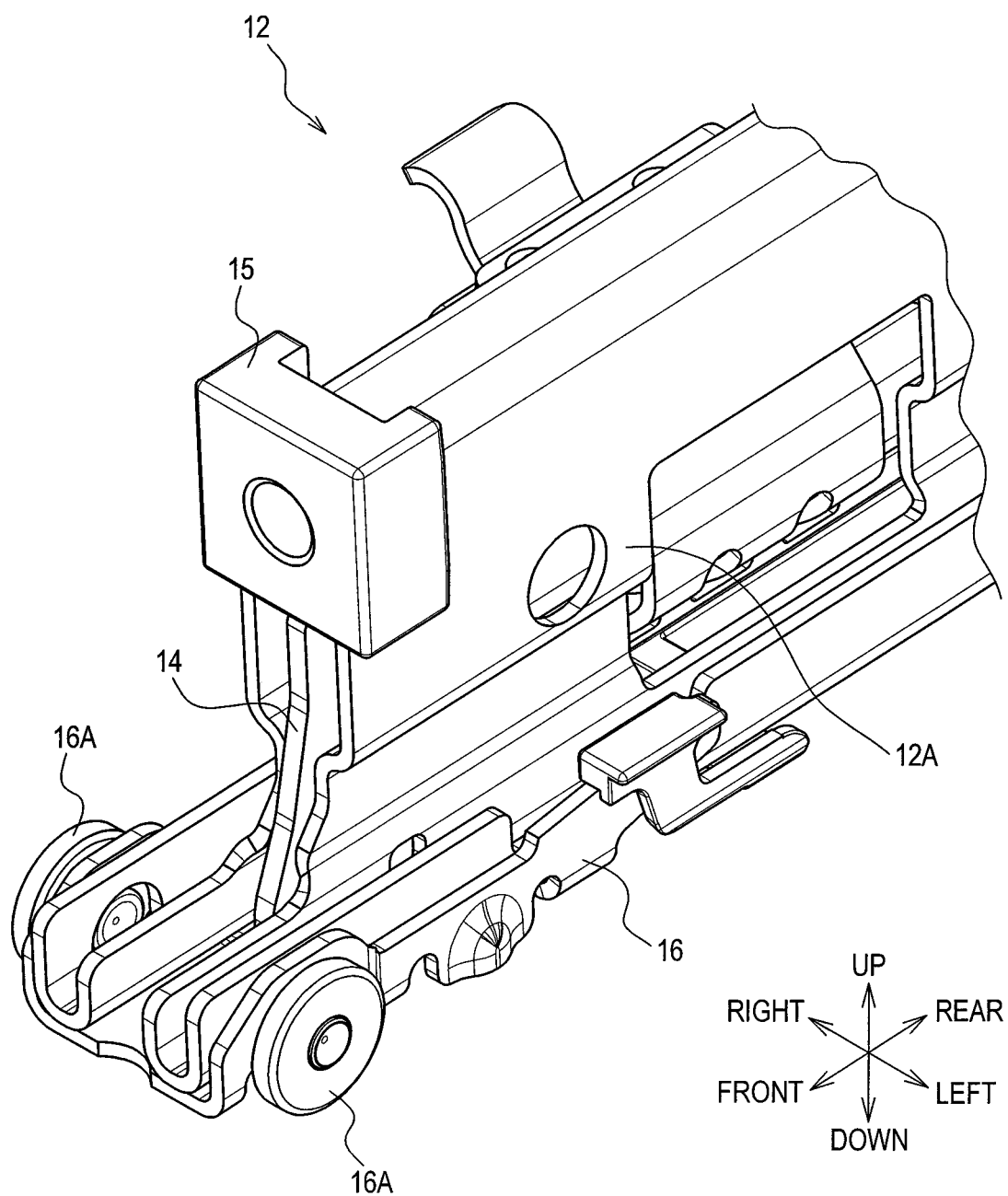
FIG. 2 is a diagram showing a front end portion of a movable rail in a sliding direction according to a first embodiment.
Figure 3:
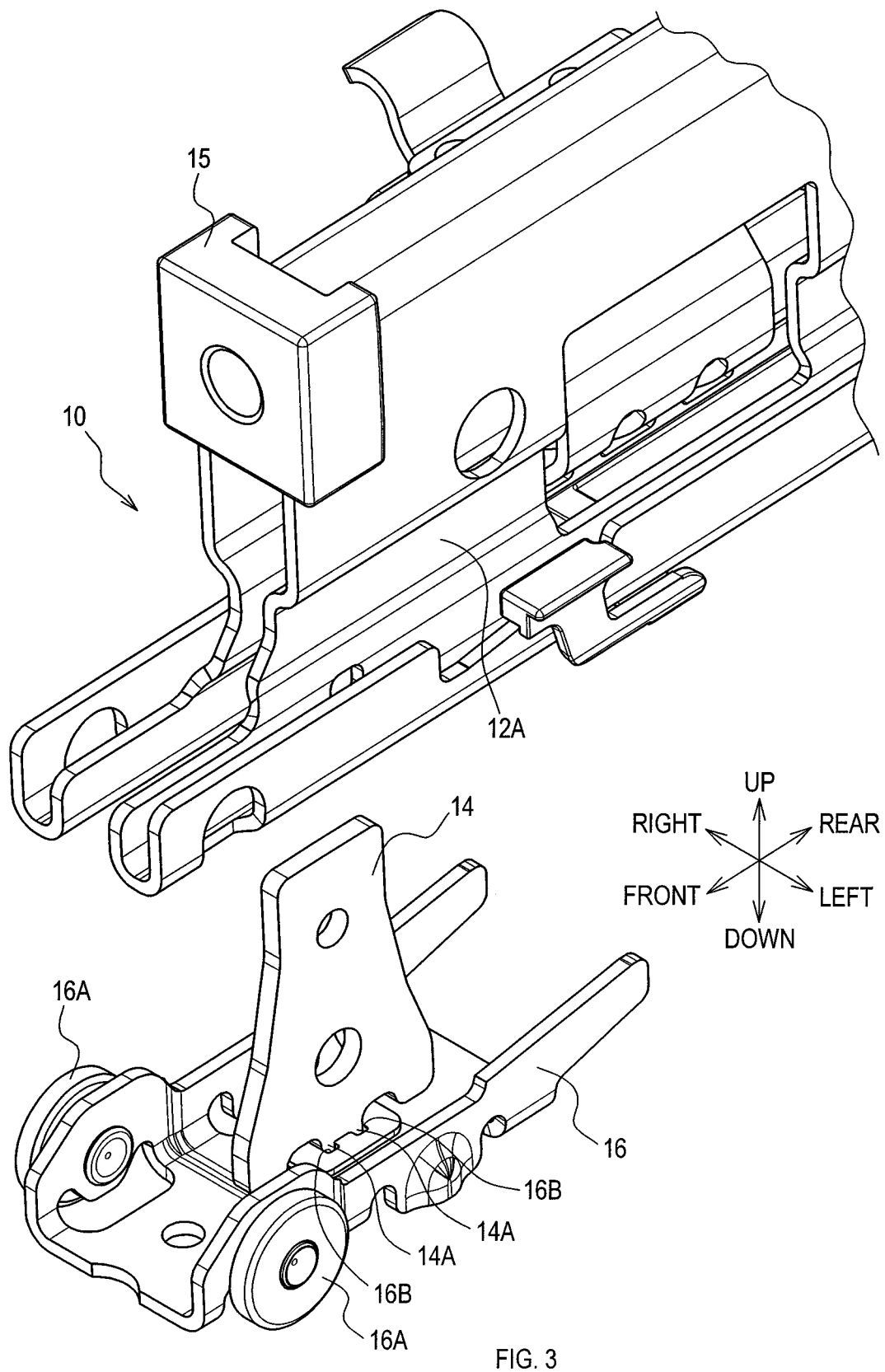
FIG. 3 is an exploded view showing the front end portion of the movable rail in the sliding direction according to the first embodiment.

In the present embodiment, the two sliding devices 10 have identical structures. The following description is directed to the sliding device 10 disposed on the left side in the seat width direction. As shown in FIGS. 1 to 3, the sliding device 10 at least comprises a fixed rail 11, a movable rail 12, and a load receiving portion 14.

<Fixed Rail and Movable Rail>

As shown in FIG. 1, the fixed rail 11 is fixed to the vehicle. The fixed rail 11 extends in a front-rear direction of the vehicle seat 1. In the present embodiment, an extending direction of the fixed rail 11 corresponds to a front-rear direction of the vehicle.

The movable rail 12 is slidable with respect to the fixed rail 11. The seat body 2 is attached to the movable rail 12. Accordingly, the seat body 2 is slidable together with the movable rail 12 in the front-rear direction of the vehicle seat 1 (in the front-rear direction of the vehicle in the present embodiment).

As shown in FIG. 2, at least one roller 16A (two rollers 16A in the present embodiment) and a roller bracket 16 are provided at least at the front end of the movable rail 12 in a sliding direction.

The two rollers 16A are one example of rolling elements and make roll contact with the fixed rail 11 enabling the movable rail 12 to be slidable. The roller bracket 16 is fixed to the movable rail 12 while supporting the two rollers 16A. The roller bracket 16 is fixed to the movable rail 12 by mechanical fasteners, such as screws or rivets, or by welding, for example.

<Load Receiving Portion>

The load receiving portion 14 can receive a load directed from the movable rail 12 to the fixed rail 11 (hereinafter referred to as a compressed load) in conjunction with the movable rail 12 when the compressed load acts on the movable rail 12. The direction of the compressed load according to the present embodiment is from top to bottom.

As shown in FIG. 3, the load receiving portion 14 is formed by a metal plate extending from the fixed rail side toward the movable rail side. The load receiving portion 14 is integrated with the movable rail 12 and is slidable with respect to the fixed rail 11.

Specifically, the load receiving portion 14 is integrated with the roller bracket 16. The load receiving portion 14 according to the present embodiment is fixed to the roller bracket 16 by swaging.

In other words, at the lower end of the load receiving portion 14, at least one protrusion 14A for swaging is provided (in the present embodiment, two protrusions 14A for swaging are provided). The roller bracket 16 is provided with at least one through hole 16B for swaging (two through holes 16B for swaging in the present embodiment) where the protrusions 14A can penetrate.

While the two protrusions 14A respectively penetrate the through holes 16B, the tips of the protrusions 14A are swaged and plastically deformed. The load receiving portion 14 is thus fixed to the roller bracket 16 by swaging.

Accordingly, while being located at the front end of the movable rail 12 in the sliding direction, the load receiving portion 14 of the present embodiment is displaced in a sliding manner together with the movable rail 12. As shown in FIG. 2, the load receiving portion 14 is located directly below the clamp 15.

In other words, the distal end of the load receiving portion 14 in an extending direction, that is, the upper end of the load receiving portion 14 is located directly below the clamp 15. Specifically, the upper end of the load receiving portion 14 faces the clamp 15 while contacting the clamp 15 or while having a gap therebetween.

The clamp 15 is a portion of the movable rail 12 and is a portion where the seat body 2 can be fastened and secured. The clamp 15 according to the present embodiment is formed by a nut member into which a bolt for fastening (not shown) can be inserted.

3. Features of Vehicle Seat (Particularly, Sliding Device) According to Present Embodiment The sliding device 10 comprises the load receiving portion 14 that can receive the compressed load in conjunction with the movable rail 12. In the sliding device 10, the movable rail 12 is thus inhibited from being deformed to a large extent even when the compressed load acts on the movable rail 12.

The load receiving portion 14 is integrated with the movable rail 12 and is slidable together with the movable rail 12 with respect to the fixed rail 11. In the sliding device 10, the compressed load thus can be received by the load receiving portion 14 irrespective of the position of the movable rail 12. Accordingly, the large deformation of the movable rail 12 can be more reliably inhibited in the sliding device 10.

The distal end of the load receiving portion 14 in the extending direction is located directly below the clamp 15. In the sliding device 10, a load such as the compressed load applied from the clamp 15 is thus more reliably transmitted to the load receiving portion 14. Accordingly, the large deformation of the movable rail 12 can be more reliably inhibited in the sliding device 10.

The load receiving portion 14 is integrated with the roller bracket 16. This can facilitate production of the sliding device 10 in which the large deformation of the movable rail 12 can be inhibited.

The load receiving portion 14 is fixed to the roller bracket 16 by swaging. Accordingly, dimensional accuracy of the roller bracket 16 can be maintained.

Specifically, if the load receiving portion 14 is fixed to the roller bracket 16 by welding, the roller bracket 16 may be thermally deformed due to the heat of the welding. In the sliding device 10, however, the load receiving portion 14 is fixed to the roller bracket 16 by swaging, which is less likely to cause thermal deformation, and thus the dimensional accuracy of the roller bracket 16 can be maintained.

The load receiving portion 14 is located at the front end of the movable rail 12 in the sliding direction. Thus, the portion of the movable rail 12 where a load such as the compressed load is highly likely to be applied can be more reliably reinforced.

Other Embodiments

For example, the load receiving portion 14 does not have to be integrated with the movable rail 12.

For example, the distal end of the load receiving portion 14 in the extending direction may be located at a position displaced from the clamp 15 in the sliding direction.

For example, the load receiving portion 14 may be provided to the main body portion 12A of the movable rail 12 (see FIG. 3).

For example, the load receiving portion 14 may be welded to the roller bracket 16 or the movable rail 12.

For example, the load receiving portion 14 may be located at a position other than at the front end of the movable rail 12 in the sliding direction.

The present disclosure can be applied to seats used in other vehicles such as railroad vehicles, ships, boats, and aircrafts, and to stationary seats used in theaters and at homes, and other places.

Furthermore, the present disclosure is only required to conform to the gist of the invention described in the above-described embodiments, and thus is not limited to the aforementioned embodiments. Accordingly, the present disclosure may be configured in combination of at least two of the aforementioned embodiments, or may be configured without some of the components illustrated in the drawings or described with reference numerals in the aforementioned embodiments.

What is claimed is:

1. A sliding device configured to support a seat body of a vehicle seat in a slidable manner, the sliding device comprising:
   a fixed rail configured to be fixed to a vehicle;
   a movable rail to which the seat body is attachable, the movable rail being slidable with respect to the fixed rail; and
   a load receiving portion extending from a fixed rail side toward a movable rail side, the load receiving portion being configured to receive a load directed from the movable rail toward the fixed rail in conjunction with the movable rail when the load acts on the movable rail,
   wherein the load receiving portion is disposed on the inner side of opposing sidewalls of the movable rail.

2. The sliding device according to claim 1, wherein the load receiving portion is configured to slide with respect to the fixed rail in an integrated manner with the movable rail.

3. The sliding device according to claim 2, wherein the movable rail comprises a clamp configured to fasten and secure the seat body, and wherein a distal end of the load receiving portion in an extending direction is located directly below the clamp.

4. The sliding device according to claim 2 further comprising at least one roller that makes the movable rail slidable with respect to the fixed rail, wherein the movable rail comprises at least one roller bracket supporting the at least one roller, and wherein the load receiving portion is integrated with the at least one roller bracket.

5. The sliding device according to claim 4, wherein the load receiving portion is fixed to the at least one roller bracket by swaging.

6. The sliding device according to claim 2, wherein the load receiving portion is located at a front end of the movable rail in a sliding direction.

7. A sliding device configured to support a seat body of a vehicle seat in a slidable manner, the sliding device comprising:
   a fixed rail configured to be fixed to a vehicle;
   a movable rail to which the seat body is attachable, the movable rail being slidable with respect to the fixed rail; and
   a load receiving portion extending from a fixed rail side toward a movable rail side, the load receiving portion being configured to receive a load directed from the movable rail toward the fixed rail in conjunction with the movable rail when the load acts on the movable rail,
   wherein a distal end of the load receiving portion in an extending direction is located above the fixed rail.

8. A sliding device configured to support a seat body of a vehicle seat in a slidable manner, the sliding device comprising:
   a fixed rail configured to be fixed to a vehicle;
   a movable rail to which the seat body is attachable, the movable rail being slidable with respect to the fixed rail; and
   a load receiving portion extending from a fixed rail side toward a movable rail side, the load receiving portion being configured to receive a load directed from the movable rail toward the fixed rail in conjunction with the movable rail when the load acts on the movable rail,
   wherein the load receiving portion is configured to transmit the received load to the fixed rail.

* * * * *